US010139913B1

United States Patent
Lee et al.

(10) Patent No.: US 10,139,913 B1
(45) Date of Patent: Nov. 27, 2018

(54) ROTATIONAL INPUT DEVICE

(71) Applicant: SUNREX TECHNOLOGY CORP., Taichung (TW)

(72) Inventors: Chih-Cheng Lee, Taichung (TW); Shun-Pin Lin, New Taipei (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 15/834,371

(22) Filed: Dec. 7, 2017

(30) Foreign Application Priority Data

Jul. 19, 2017 (TW) .............................. 106210608 A

(51) Int. Cl.
  *G06F 3/01* (2006.01)
  *B06B 1/06* (2006.01)
  *G05G 1/08* (2006.01)

(52) U.S. Cl.
  CPC ................ *G06F 3/016* (2013.01); *B06B 1/06* (2013.01); *G05G 1/08* (2013.01)

(58) Field of Classification Search
  CPC ......... G06F 3/016; G06F 3/0362; B06B 1/06; G05G 1/08
  See application file for complete search history.

(56) References Cited

U.S. PATENT DOCUMENTS

| | | | | |
|---|---|---|---|---|
| 2010/0110001 | A1* | 5/2010 | Yamamoto | G06F 3/017 345/156 |
| 2011/0157231 | A1* | 6/2011 | Ye | G09G 3/20 345/649 |
| 2012/0256959 | A1* | 10/2012 | Ye | G06F 3/0488 345/649 |
| 2014/0195016 | A1* | 7/2014 | Yamamoto | G06F 3/017 700/83 |

* cited by examiner

*Primary Examiner* — Sisay Yacob
(74) *Attorney, Agent, or Firm* — Birch, Stewart, Kolasch & Birch, LLP

(57) ABSTRACT

A rotational input device is to be operated, and includes a device body, a rotatable unit rotating in response to operation, a sensing unit detecting an amount of rotation of the rotatable unit to generate a detection signal, and a processing unit connected to the sensing unit. After receiving the detection signal, the processing unit calculates an angular acceleration of the rotatable unit based on the detection signal, and determines whether the angular acceleration is greater than a predetermined threshold. In the affirmative, the processing unit divides the amount of rotation by a preset amount of rotation to obtain a first output value, and generates an input signal based on a second output value that is determined based on the first output value.

8 Claims, 5 Drawing Sheets

ROTATIONAL INPUT DEVICE

CROSS-REFERENCE TO RELATED APPLICATION

This application claims priority of Taiwanese Utility Model Patent Application No. 106210608, filed on Jul. 19, 2017.

FIELD

The disclosure relates to an input device, and more particularly to a rotational input device.

BACKGROUND

A conventional rotational input device, such as the Surface Dial provided by Microsoft Corporation, includes a dial and a sensing unit for detecting an amount of rotation of the dial. Based on the amount of rotation detected by the sensing unit, the sensing unit transmits a detection signal to a computer according to a human interface device (HID) standard so as to enable a processing unit of the computer to output an operation signal based on the detection signal.

To precisely detect the amount of rotation of the dial, in a case where a physical size of the dial is small, a sensing unit with a high resolution detecting ability is required, resulting in an increased relevant implementation cost. Taking an example that an n-degree (n is an integer) rotation of the dial enables the conventional rotational input device to generate an n-level input for explanation, given that the dial has a diameter of six centimeters, an amount of rotation (i.e., an arc length traveled by a point on a circumference of the dial) equal to 0.52 millimeters $$\left(\text{i.e., } 6 \times \frac{\pi}{360} = 0.052\right)$$

is required to result in a unit level input to the computer which is connected with the rotational input device. When the diameter of the dial is reduced to one centimeter, the amount of rotation required to result in the same unit level input will be reduced correspondingly to 0.087 millimeters $$\left(\text{i.e., } 1 \times \frac{\pi}{360} = 0.0087\right),$$

which is the amount of rotation that should be detectable by the sensing unit. On the other hand, a larger physical size of the dial alleviates the requirement for a higher-resolution sensing unit, but a resultant heavier weight and cumbersomeness of the dial may adversely affect efficiency of operation of such conventional rotational input device.

SUMMARY

Therefore, an object of the disclosure is to provide a rotational input device that can alleviate at least one of the drawbacks of the prior art.

According to the disclosure, the rotational input device is to be operated by a user for generating an input signal, and includes a device body, a rotatable unit disposed at the device body, a sensing unit accommodated in the device body, and a processing unit accommodated in the device body.

The rotatable unit is configured to rotate in response to operation by the user.

The sensing unit is configured to detect an amount of rotation of the rotatable unit, which is an arc length traveled by a point on a circumference of the rotatable unit during rotation of the rotatable unit in response to the operation by the user, so as to generate a detection signal indicating the amount of rotation thus detected.

The processing unit is electrically connected to the sensing unit. The processing unit is configured to calculate, after the processing unit receives the detection signal thus generated from the sensing unit, an angular acceleration of the rotatable unit based on the detection signal. The processing unit is configured to determine whether the angular acceleration thus calculated is greater than a predetermined threshold. The processing unit is configured to, when it is determined by the processing unit that the angular acceleration thus calculated is greater than the predetermined threshold, divide the amount of rotation thus detected by a preset amount of rotation so as to obtain a first output value, determine a second output value that is greater than the first output value based on the first output value, and generate the input signal based on the second output value.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
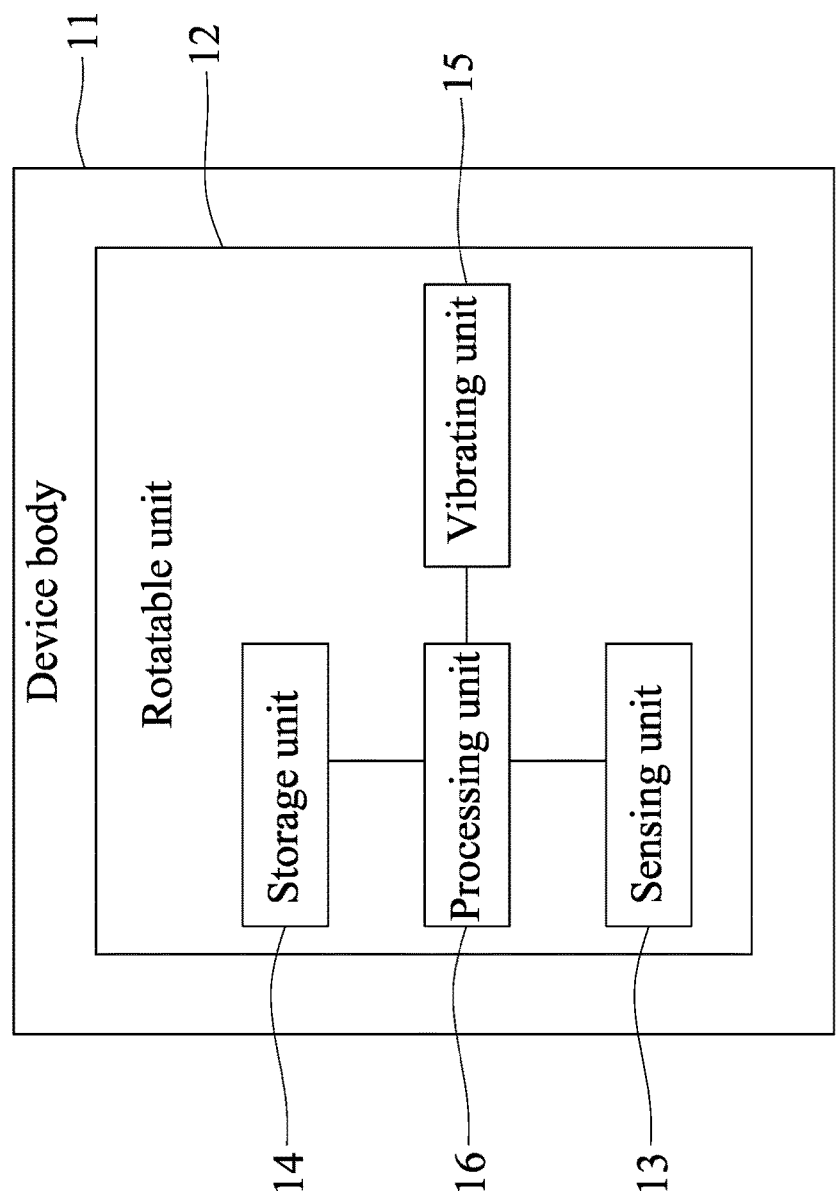
FIG. 1 is a block diagram illustrating a first embodiment of a rotational input device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
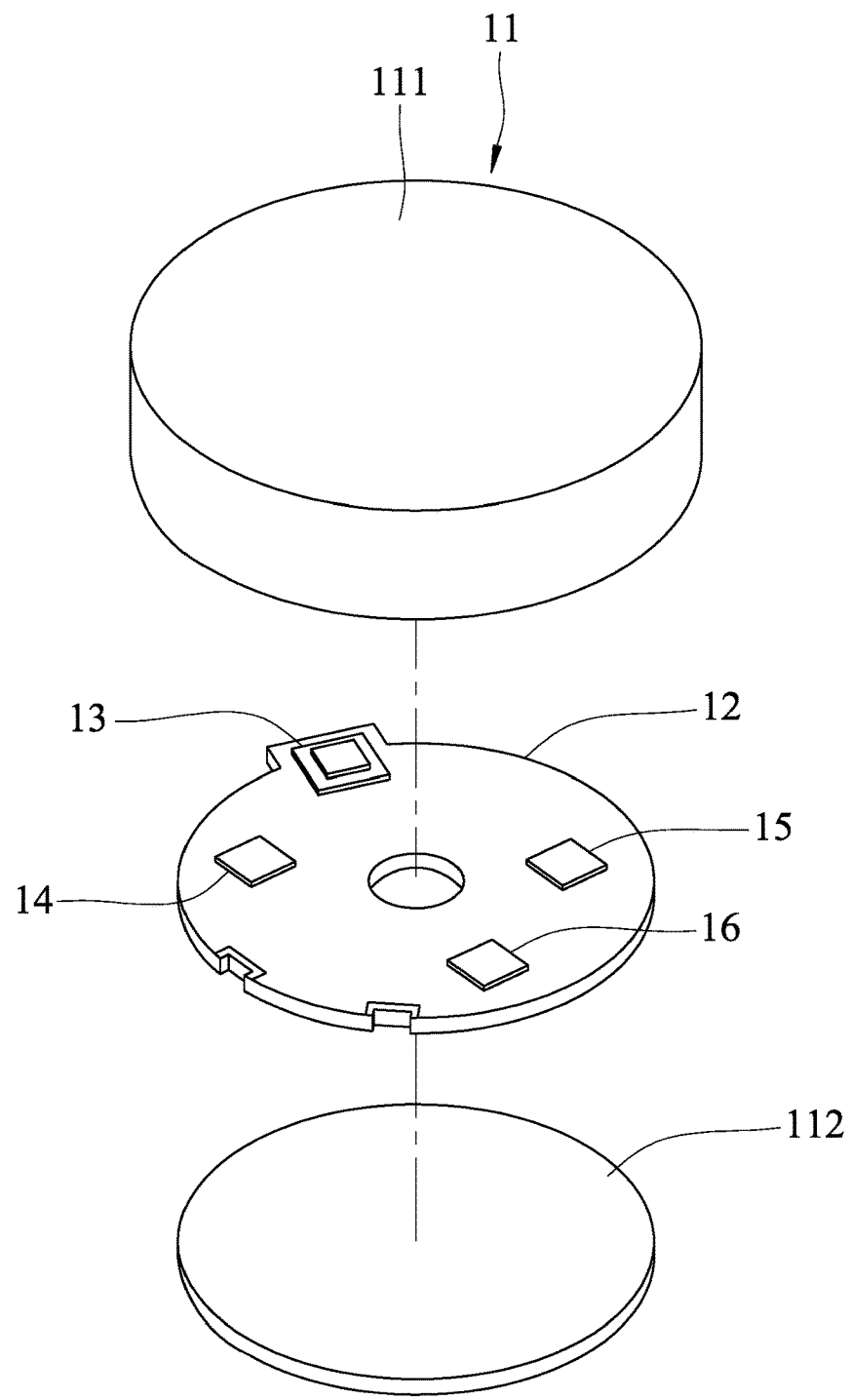
FIG. 2 is an exploded perspective view illustrating the first embodiment of the rotational input device according to the disclosure.

Referring to FIGS. 1 and 2, a first embodiment of a rotational input device according to this disclosure is illustrated.

The rotational input device is to be operated by a user for generating an input signal. The rotational input device includes a device body 11, a rotatable unit 12, a sensing unit 13, a storage unit 14, a vibrating unit 15 and a processing unit 16.

The device body 11 includes a housing 111 and a bottom cover 112.

The rotatable unit 12 is accommodated in the housing 111 of the device body 11, and is configured to corotate with the housing 111 in response to operation by the user. The rotatable unit 12 may be implemented to include at least one of a knob, a roller or a rotary plate, but implementation of the rotatable unit 12 is not limited thereto. In this embodiment, the rotatable unit 12 is implemented by the rotary plate, and the user can rotate the housing 111 of the device body 11 which engages the rotatable unit 12 to bring the rotatable unit 12 to rotate.

The sensing unit 13 is accommodated in the housing 111 of the device body 11 and is disposed on the rotatable unit 12. The sensing unit 13 is configured to detect an amount of rotation of the rotatable unit 12, which is an arc length traveled by a point on a circumference of the rotatable unit 12 during rotation of the rotatable unit 12 in response to the operation by the user, so as to generate a detection signal indicating the amount of rotation thus detected. The sensing unit 13 may be implemented by a rotary encoder or an optical engine. The detection signal may be implemented to be encoded as a pulse signal or a step signal, but is not limited thereto. The sensing unit 13 is configured to detect the amount of rotation of the rotatable unit 12 by way of optical encoding, magnetic encoding, or encoding with an electrical conductive track.

The storage unit 14 is accommodated in the housing 111 of the device body 11 and is disposed on the rotatable unit 12. The storage unit 14 may be implemented by at least one of a flash memory or any other semiconductor memory chip, but is not limited thereto. The storage unit 14 stores a predetermined lookup table which is associated with correspondence relationships between a first output value and a second output value. In this embodiment, the first output value and the second output value are both integers and the predetermined lookup table is exemplified by Table 1 below, but implementations of the first output value and the second output value may vary in other embodiments and are not limited to what are disclosed herein. In some embodiments, the first output value and the second output value are both non-integers.

TABLE 1

| First output value | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Second output value | 0 | 1 | 4 | 6 | 8 | 12 | 16 | 24 | 32 | 48 | 64 | 96 | 128 | 150 | 192 | 256 |

The vibrating unit 15 is accommodated in the housing 111 of the device body 11 and is disposed on the rotatable unit 12. The vibrating unit 15 is configured to vibrate upon receiving a vibration signal. The vibrating unit 15 is implemented by a piezoelectric vibrator, but implementation thereof is not limited thereto.

The processing unit 16 is accommodated in the housing 111 of the device body 11, is disposed on the rotatable unit 12, and is electrically connected to the sensing unit 13, the storage unit 14 and the vibrating unit 15. The processing unit 16 may be implemented by a processor, a Central Processing Unit (CPU), a microprocessor or any circuit configurable/programmable in a software manner and/or hardware manner to implement functionalities disclosed in this disclosure.

The processing unit 16 is configured to receive the detection signal generated by the sensing unit 13 from the sensing unit 13, to generate the vibration signal based on the amount of rotation indicated by the detection signal, and to transmit the vibration signal to the vibrating unit 15 so as to enable the vibrating unit 15 to vibrate based on the vibration signal thus received. For example, the larger amount of rotation indicated by the detecting signal results in the vibration signal which enables the vibrating unit 15 to vibrate with higher intensity.

The processing unit 16 is further configured to calculate, after receiving the detection signal generated by the sensing unit 13, an angular acceleration of the rotatable unit 12 based on the detection signal. The processing unit 16 is configured to determine whether the angular acceleration thus calculated is greater than a predetermined threshold. Specifically speaking, the angular acceleration is calculated by the processing unit 16 based on a portion of the amount of rotation detected within a cycling period of time (e.g., 1 second). For example, assuming that an initial angular velocity of the rotatable unit 12 is zero, the angular acceleration of the rotatable unit 12 thus calculated can be expressed as $$\alpha = \frac{2r}{t^2},$$

where α represents the angular acceleration of the rotatable unit 12, r represents the portion of the amount of rotation within the cycling period of time, and t represents the cycling period of time during which the angular acceleration is calculated.

The processing unit 16 is configured to, when it is determined by the processing unit 16 that the angular acceleration thus calculated is not greater than the predetermined threshold, divide the amount of rotation thus detected by a preset amount of rotation, which is a minimum amount of rotation (i.e., a minimum arc length) perceivable by a human being and which is a constant determined in advance through experimentation, so as to obtain the first output value, and generate the input signal based on the first output value. That is to say, the first output value can be expressed in mathematics as $$n = \frac{r}{d},$$

where n represents the first output value, r represents the amount of rotation indicated by the detection signal, and d represents the preset amount of rotation. It is worth to note that the processing unit 16 is configured to round the first output value to an integer, e.g., i, and the input signal to be generated based on the integer will represent a level i input. For example, when the first output value is rounded to one, i.e., i=1, the input signal generated based thereon will result in a level one input to an electronic device (not shown) which receives the input signal. Likewise, the input signal generated based on the first output value which is rounded to two (i.e., i=2) will result in a level two input to the electronic device, and the input signal generated based on the first output value which is rounded to k (i.e., i=k, where k is an integer) will result in a level k input to the electronic device. In this embodiment, the preset amount of rotation is implemented to be an amount of rotation the rotatable unit 12 is to be rotated for resulting in the level one input through operating the rotational input device. The preset amount of rotation is the minimum amount of rotation (e.g., 0.05 centimeters) perceivable by a human being as the device body 11 is operated to rotate the rotatable unit 12. However, in other embodiments, the preset amount of rotation may be implemented to be greater than 0.05 centimeters, and implementation thereof is not limited to what is disclosed herein.

For instance, when a rotatable unit 12 having a diameter of one centimeter is rotated in response to user operation by an amount of rotation equal to 0.2 centimeters, the sensing unit 13 will generate a detection signal indicating that the amount of rotation thus detected is 0.2 centimeters. When it is determined by the processing unit 16 that the angular acceleration thus calculated is not greater than the predetermined threshold, the first output value obtained by the processing unit 16 will be four, i.e., $$n = \frac{0.2}{0.05} = 4.$$

Therefore, based on the first output value thus obtained, the rotational input device generates the input signal which results in a level four input to the electronic device which receives the input signal.

On the other hand, the processing unit 16 is further configured to, when it is determined by the processing unit 16 that the angular acceleration thus calculated is greater than the predetermined threshold, divide the amount of rotation thus detected by the preset amount of rotation so as to obtain the first output value, determine the second output value that is greater than the first output value based on the first output value and the predetermined lookup table, and generate the input signal based on the second output value. It is worth to note that in this embodiment, the processing unit 16 is configured to round the first output value to an integer, and to determine the second output value based on the predetermined lookup table and the integer to which the first output value is rounded. Given that the second output value is represented by m, the input signal thus generated based thereon will represent a level m input. That is to say, the input signal generated based on the second output value which is equal to one (i.e., m=1) will result in a level one input to the electronic device which receives the input signal from the rotational input device. Likewise, the input signal generated based on the second output value which is equal to two (i.e., m=2) will result in a level two input to the electronic device, and the input signal generated based on the second output value which is equal to k (i.e., m=k, where k is an integer) will result in a level k input to the electronic device. As an example, when a rotatable unit 12 having a diameter of one centimeter is rotated in response to user operation by an amount of rotation equal to 0.2 centimeters, the sensing unit 13 will generate a detection signal indicating that the amount of rotation thus detected is 0.2 centimeters. When it is determined by the processing unit 16 that the angular acceleration thus calculated is greater than the predetermined threshold, the first output value obtained by the processing unit 16 will be four, i.e., $$n = \frac{0.2}{0.05} = 4,$$

and the second output value obtained by the processing unit 16 according to the predetermined lookup table shown in Table 1 will be eight. Therefore, the rotational input device generates the input signal which results in a level eight input to the electronic device.

Figure 3:
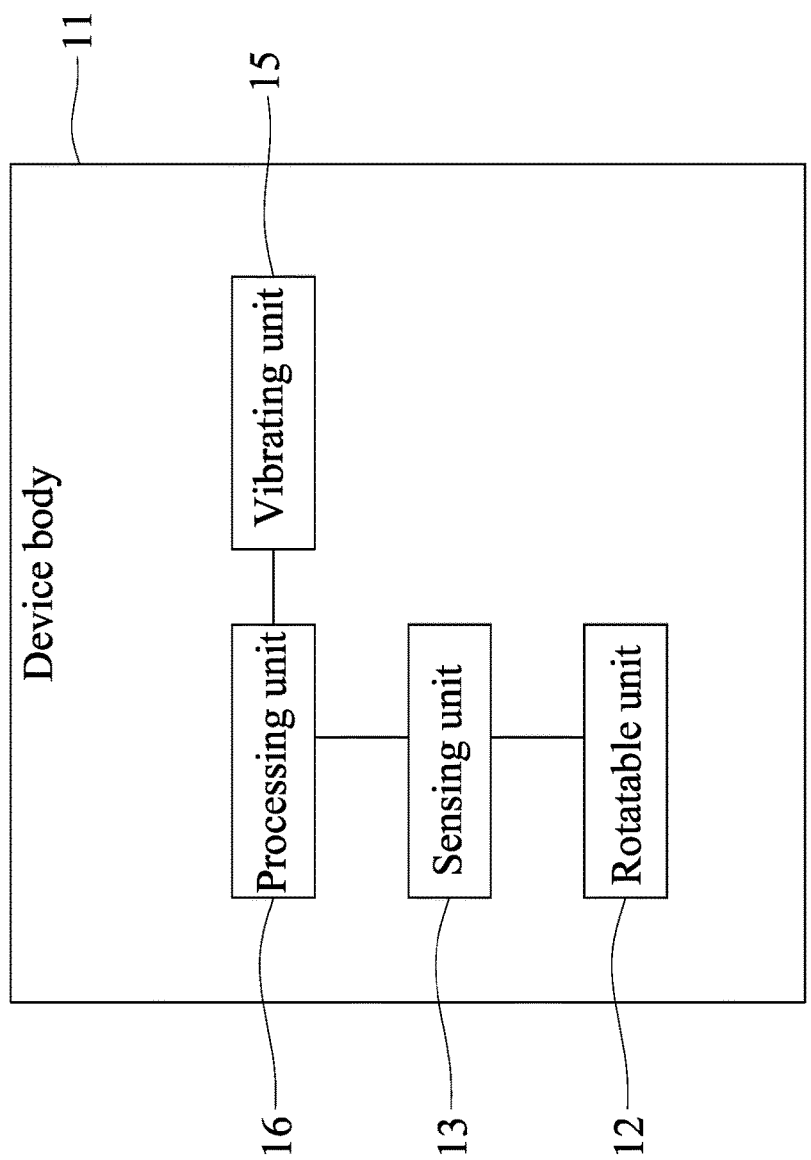
FIG. 3 is a block diagram illustrating a second embodiment of the rotational input device according to the disclosure.
Figure 4:
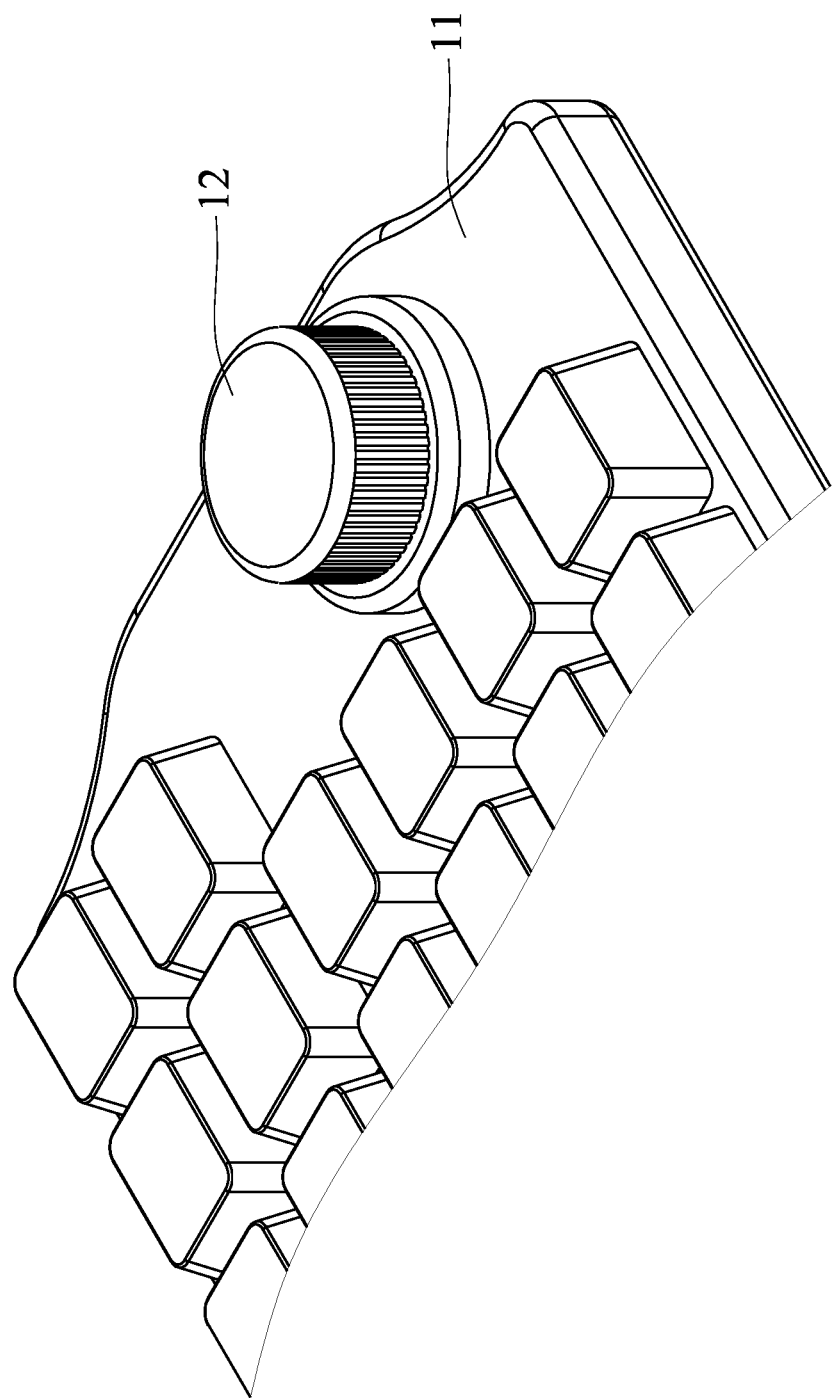
FIG. 4 is a fragmentary perspective view illustrating the second embodiment of the rotational input device according to the disclosure.

Referring to FIGS. 3 and 4, a second embodiment of the rotational input device according to this disclosure is illustrated. The second embodiment is similar to the first embodiment, but is different in that the second embodiment does not include the storage unit 14.

Additionally, the device body 11 is implemented to include a keyboard body. The rotatable unit 12 is implemented by a knob disposed on the keyboard body, and is accessible to a user for being turned thereby to rotate. The sensing unit 13, the vibrating unit 15 and the processing unit 16 are disposed in the keyboard body.

In addition, the processing unit 16 is configured to, when it is determined by the processing unit 16 that the angular acceleration thus calculated is greater than the predetermined threshold, divide the amount of rotation thus detected by the preset amount of rotation so as to obtain the first output value, to determine the second output value based on the first output value, and to generate the input signal based on the second output value. In this embodiment, the first output value and the second output value have nonlinear relationship with each other. The second output value is equal to two to the power of (n−1), i.e., $m=2^{n-1}$, where m represents the second output value, and n is the first output value.

For instance, when a rotatable unit 12 whose diameter is one centimeter is operated to rotate by an amount of rotation equal to 0.2 centimeters, the sensing unit 13 will generate a detection signal indicating that the amount of rotation thus detected is 0.2 centimeters. When it is determined by the processing unit 16 that the angular acceleration thus calculated is greater than the predetermined threshold, the first output value obtained by the processing unit 16 will be four, i.e., $$n = \frac{0.2}{0.05} = 4,$$

and the second output value obtained by the processing unit 16 will be eight, i.e., $m=2^{4-1}=8$. Therefore, the rotational input device generates the input signal which results in a level eight input to the electronic device that receives the input signal from the rotational input device.

Figure 5:
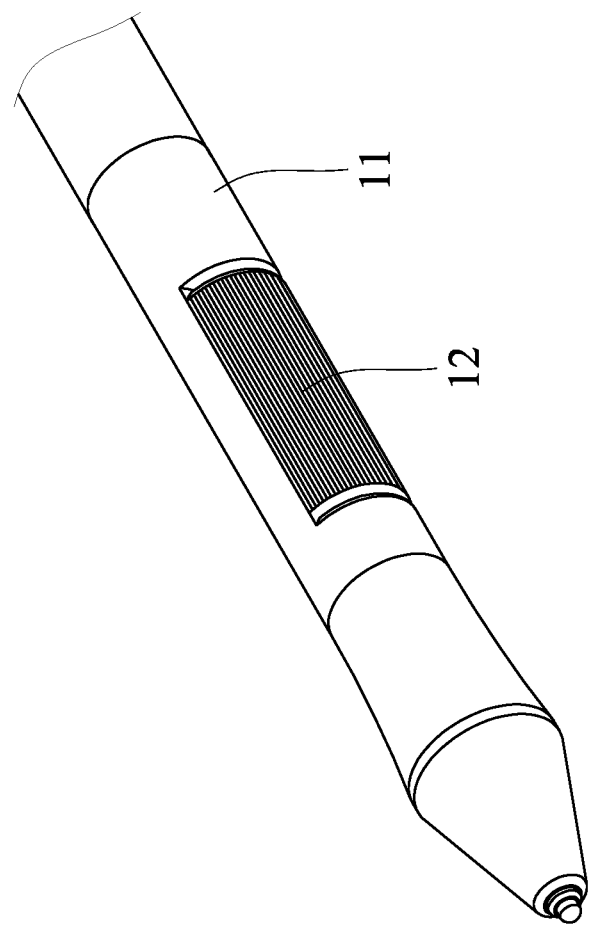
FIG. 5 is a fragmentary perspective view illustrating a third embodiment of the rotational input device according to the disclosure.

Referring to FIG. 5, a third embodiment of the rotational input device according to this disclosure is illustrated. The third embodiment is similar to the second embodiment, but is different in that the device body 11 of the third embodiment is implemented by a body of a stylus. The rotatable unit 12 is implemented by a roller disposed in the device body 11 and partly accessible to a user via a window of the device body 11 for manual operation by the user to rotate the rotatable unit 12.

In summary, the rotational input device of this disclosure generates the input signal based on whether the angular acceleration of the rotatable unit is greater than the predetermined threshold. Amplifying the input level when the angular acceleration of the rotatable unit is greater than the predetermined threshold enhances efficiency of operating the rotational input device. Moreover, utilizing the preset amount of rotation, which is a minimum amount of rotation perceivable by a human being, as a unit amount of operation for generating the input signal that results in a unit level input to an electronic device facilitates the realization of miniaturization of the rotatable unit 12 without the burden of increasing the resolution requirement of the sensing unit 13, so as to facilitate operation of the rotational input device while implementation cost of the rotational input device may be kept unchanged. Furthermore, since the resolution limitation of the sensing unit 13 is no longer a concern when considering the physical size of the rotational unit 12, freedom of industrial design of the appearance of the rotational input device is greatly increased.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A rotational input device to be operated by a user for generating an input signal, said rotational input device comprising:
   a device body;
   a rotatable unit disposed at said device body and configured to rotate in response to operation by the user;
   a sensing unit accommodated in said device body and configured to detect an amount of rotation of said rotatable unit, which is an arc length traveled by a point on a circumference of said rotatable unit during rotation of said rotatable unit in response to the operation by the user, and to generate a detection signal indicating the amount of rotation detected by said sensing unit; and
   a processing unit accommodated in said device body, electrically connected to said sensing unit, and configured to
      calculate, after said processing unit receives the detection signal generated by said sensing unit from said sensing unit, an angular acceleration of said rotatable unit based on the detection signal,
      determine whether the angular acceleration calculated by said processing unit is greater than a predetermined threshold, and
      when it is determined by said processing unit that the angular acceleration calculated by said processing unit is greater than the predetermined threshold, divide the amount of rotation detected by said sensing unit by a preset amount of rotation to obtain a first output value, determine a second output value that is greater than the first output value based on the first output value, and generate the input signal based on the second output value.

2. The rotational input device as claimed in claim 1, wherein said processing unit is configured to, when it is determined by said processing unit that the angular acceleration calculated by said processing unit is not greater than the predetermined threshold, divide the amount of rotation detected by said sensing unit by the preset amount of rotation to obtain the first output value, and generate the input signal based on the first output value.

3. The rotational input device as claimed in claim 1, wherein the first output value and the second output value have nonlinear relationship with each other.

4. The rotational input device as claimed in claim 1, wherein the second output value is equal to two to the power of (n−1), where n is the first output value.

5. The rotational input device as claimed in claim 1, further comprising a storage unit electrically connected to said processing unit, accommodated in said device body, and storing a predetermined lookup table which is associated with correspondence relationships between the first output value and the second output value, wherein said processing unit is configured to round the first output value to an integer, and to determine the second output value based on the predetermined lookup table and the integer to which the first output value is rounded.

6. The rotational input device as claimed in claim 1, further comprising a vibrating unit electrically connected to said processing unit and accommodated in said device body, wherein said processing unit is configured to generate a vibration signal based on the amount of rotation indicated by the detection signal, and transmit the vibration signal to said vibrating unit to enable said vibrating unit to vibrate upon receiving the vibration signal.

7. The rotational input device as claimed in claim 1, wherein said rotatable unit includes at least one of a knob, a roller or a rotary plate.

8. The rotational input device as claimed in claim 1, wherein said sensing unit is configured to detect the amount of rotation of said rotatable unit by optical encoding, magnetic encoding, or encoding with an electrical conductive track.

* * * * *